Dec. 25, 1923.
E. E. HACHMAN
HEADLIGHT REFLECTOR
Filed Feb. 10, 1923
1,478,898
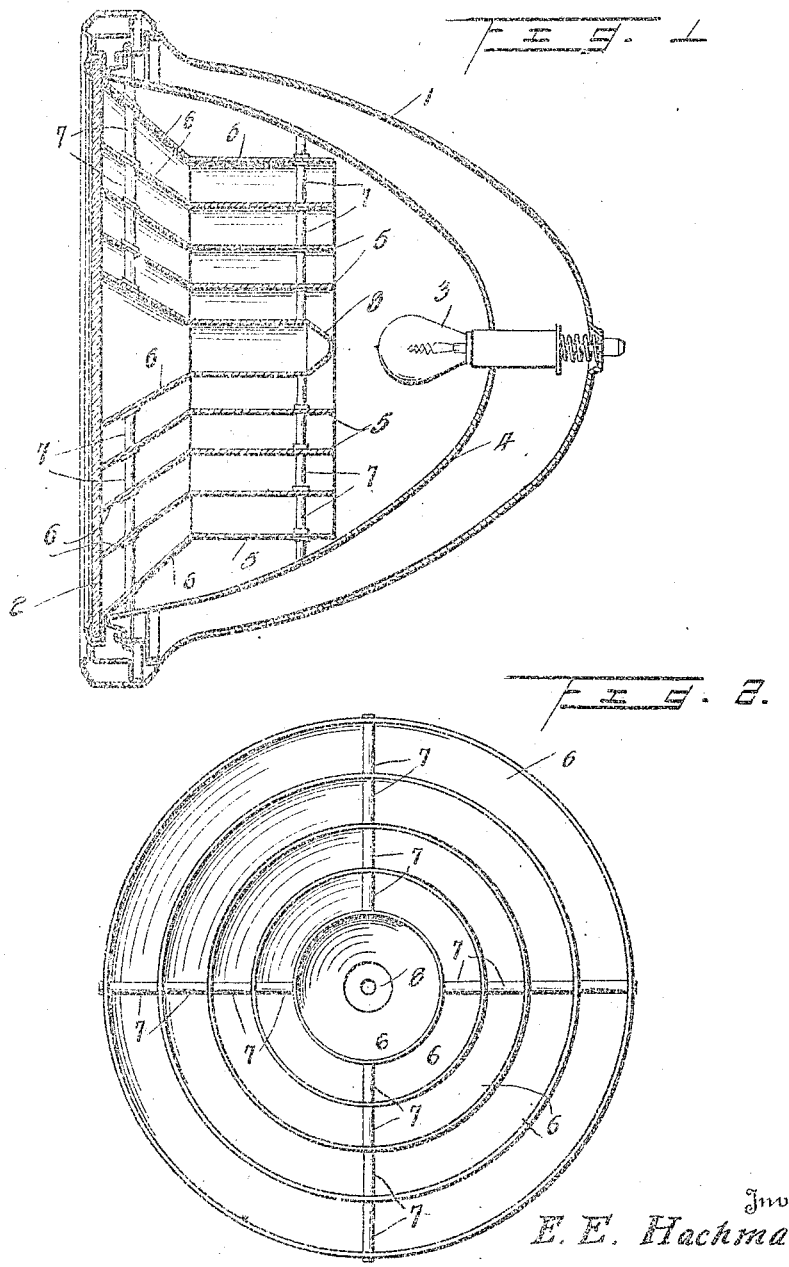
Inventor
E. E. Hachman.

Patented Dec. 25, 1923.

1,478,898

UNITED STATES PATENT OFFICE.

ELMER E. HACHMAN, OF BALTIMORE, MARYLAND.

HEADLIGHT REFLECTOR.

Application filed February 10, 1923. Serial No. 618,344.

*To all whom it may concern:*

Be it known that I, ELMER E. HACHMAN, a citizen of the United States, residing at Baltimore, in the county of Baltimore City and State of Maryland, have invented certain new and useful Improvements in Headlight Reflectors; and I do hereby declare the following to be a full, clear, and exact description of the invention, such as will enable others skilled in the art to which it appertains to make and use the same.

The invention has for its object the provision of a reflector designed particularly for the headlight of a motor vehicle, such as an automobile, whereby to project the light and at the same time to diffuse the rays and prevent glare and a clear discernment of the source of light.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a central longitudinal section of a headlight embodying the invention, and Figure 2 is a front view of the reflector.

Corresponding and like parts are referred to in the following description and designated in the several views of the drawings by like reference characters.

The numeral 1 designates a frame or casing for receiving the source of light and the reflector which embodies the invention. The casing 1 is provided at its front with a lens or transparent cover 2 which may be of any form commonly employed in headlights. A lamp 3 is disposed within the casing 1 and constitutes the source of light and may be of any variety. In the present instance, the lamp is shown as consisting of an electric bulb.

The reflector embodying the invention is of composite structure and disposed within the usual parabolic reflector 4 of the casing 1, the lamp 3 being disposed within the reflector 4 at the focal center thereof. The composite reflector comprises a plurality of units having a concentric arrangement, each unit consisting of a cylinder 5 and a cone 6, the several units being preferably of uniform length but varying in diameter to admit the concentric arrangement. The units may consist of any suitable material which will reflect light and are separately formed and assembled so that one is disposed within the other. The length and arrangement of the units are such as to preclude the transmission of rays of light through the reflector in straight lines, hence the light is deflected in its passage through the reflector so that the source of light is not discernible and as a result the projected light is soft and devoid of glare, which is objectionable in a vehicle headlight. The units are maintained in spaced relation by spacing elements 7 projecting laterally therefrom, either inwardly or outwardly, or both, as preferred. When the units are nested or assembled, outward displacement thereof is prevented by the front 2 which is in contact with the outer ends. The innermost unit has its inner end constricted, as indicated at 8, to prevent clear observation of the source of light.

What is claimed is:

1. A device of the class described consisting of a plurality of units, said units having cylindrical portions in concentric, spaced and nested relation and disposed adjacent the source of light, and a forwardly and outwardly flaring portion extending from the cylindrical portion on the end thereof opposite to the source of light.

2. A device of the class described consisting of a plurality of units, said units having cylindrical portions in concentric, spaced and nested relation and disposed adjacent the source of light, and a forwardly and outwardly flaring portion extending from the cylindrical portions on the end thereof opposite to the source of light, and the central unit having the inner end of its cylindrical portion constricted and adapted for arrangement substantially in line with the source of light.

In testimony whereof I affix my signature in presence of a witness.

ELMER E. HACHMAN.

Witness:
BENNETT S. JONES.